United States Patent [19]

Sauvago

[11] 4,414,708
[45] Nov. 15, 1983

[54] AUTOMATIC LIVESTOCK HEAD SPLITTER

[75] Inventor: Phillip J. Sauvago, Denison, Iowa

[73] Assignee: Farmland Foods, Inc., Kansas City, Mo.

[21] Appl. No.: 366,160

[22] Filed: Apr. 7, 1982

[51] Int. Cl.³ .................................................. A22B 5/20
[52] U.S. Cl. ........................................ 17/1 R; 17/23; 83/435.2; 83/409.1
[58] Field of Search ............... 17/1 R, 1 A, 23, 24; 83/155.1, 409, 409.1, 423, 430, 435, 435.2, 466.1

[56] References Cited

U.S. PATENT DOCUMENTS

| | | | |
|---|---|---|---|
| 1,720,127 | 7/1929 | Kaufmann et al. | 17/1 R |
| 1,752,487 | 4/1930 | Hoag | 83/435.2 X |
| 2,571,531 | 10/1951 | Bridge | 83/435.2 X |
| 3,062,250 | 11/1962 | Kressin | 83/409.1 X |
| 3,611,478 | 10/1971 | Lockerby | 17/71 |
| 3,890,673 | 6/1975 | Neubauer | 17/23 X |
| 4,052,769 | 10/1977 | Thillet et al. | 17/23 |

Primary Examiner—Willie G. Abercrombie
Attorney, Agent, or Firm—Schmidt, Johnson, Hovey & Williams

[57] ABSTRACT

An automatic livestock head splitter is provided which serves to sever the skull of a butchered hog without damaging the brain or the pituitary gland of the hog. The head splitter preferably includes a frame, a circular blade rotatably carried by the frame having a peripheral cutting edge that includes a plurality of notches, a plurality of platens moveably supported by the frame and connected together in serial order, a prime mover for rotating the blade and advancing the platens into a cutting position relative to the blade, and a coupling power drive for connecting the prime mover, blade and platens for rotation of the blade in synchronism with the movement of the platens. The platens are configured for rigidly carrying a butchered and trimmed hog's head and are advanced along the frame by a sprocketed drive wheel. The platens move in synchronism with the rotation of the blade such that a head carried by a platen is split by the blade while the brain and pituitary gland of the head are received within one of the notches in the blade. The teeth of the sprocket wheel are drivingly received within respective platen apertures and thereby also operate to dislodge the severed head from the platen after the platen clears the blade.

15 Claims, 7 Drawing Figures

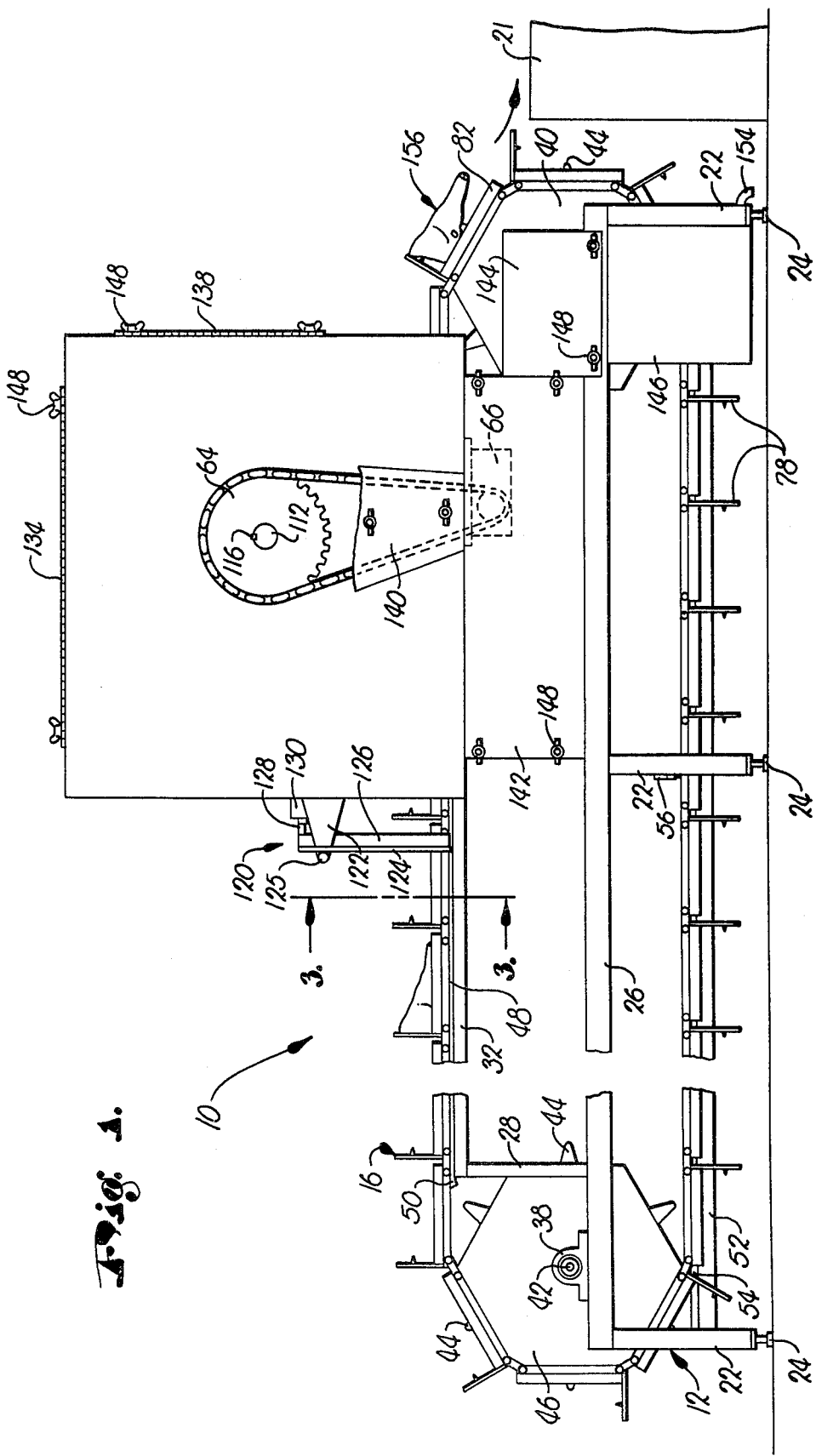

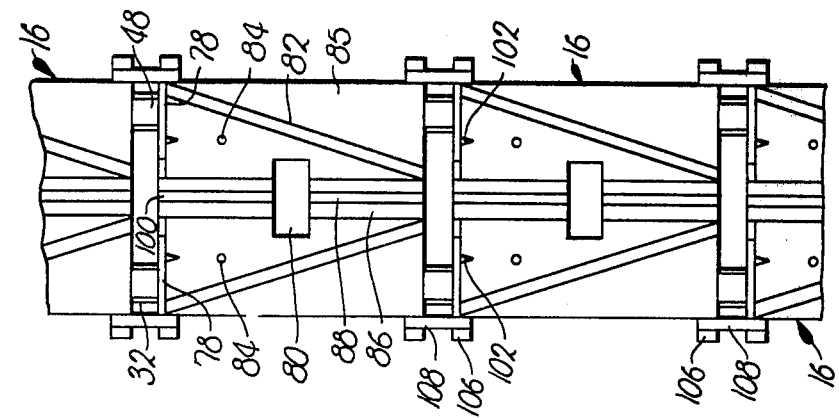
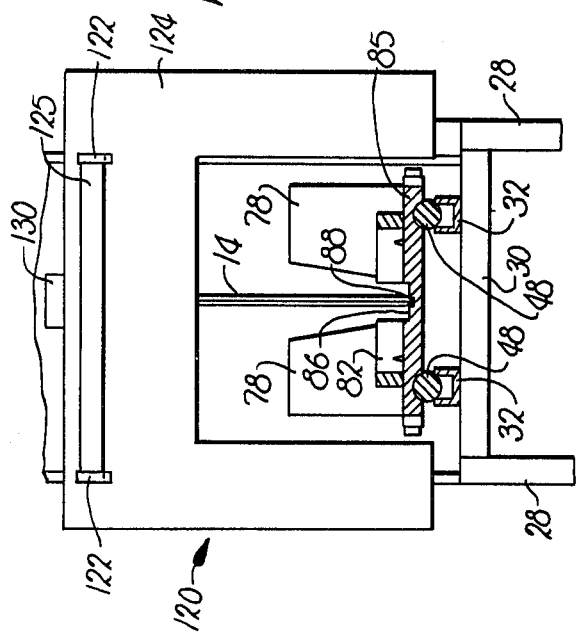
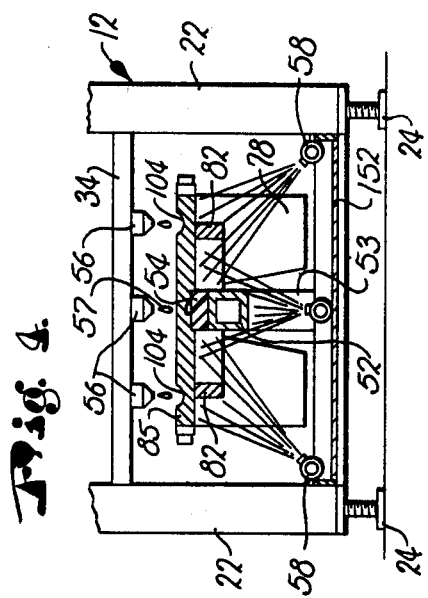
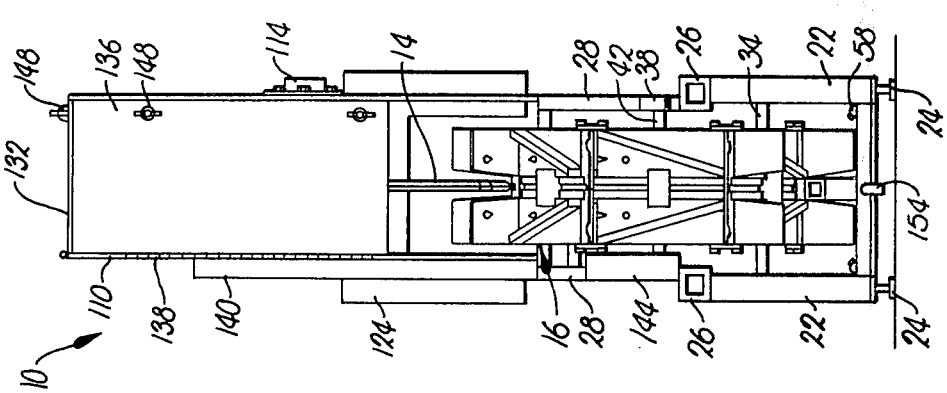

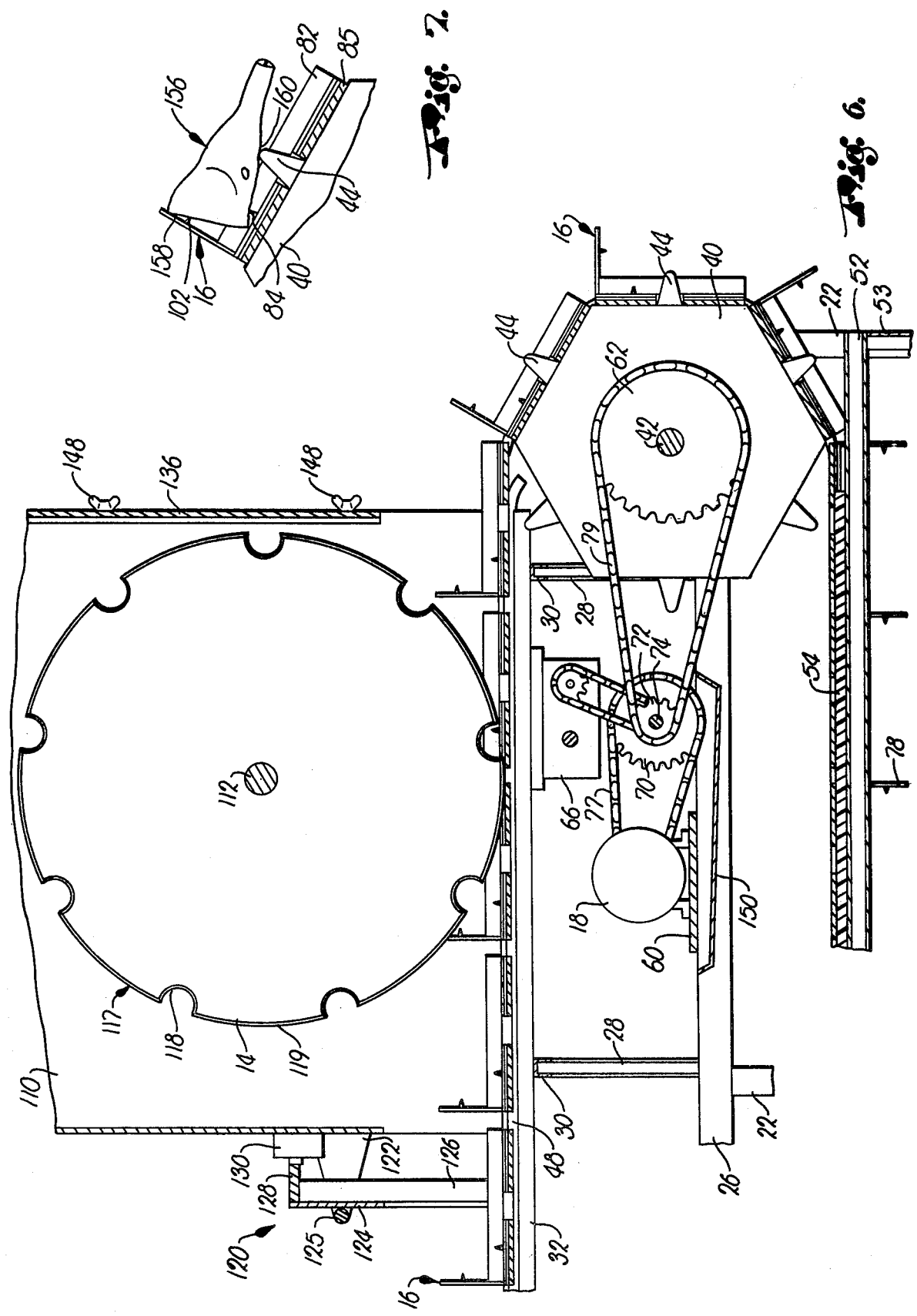

AUTOMATIC LIVESTOCK HEAD SPLITTER

BACKGROUND OF THE INVENTION

1. Field of the Invention

This invention relates to an automatic livestock head splitter of simple yet highly effective construction which has numerous advantages including the ability to split livestock heads at a rapid rate, with a minimum of operator involvement and power requirements, while at the same time protecting selected internal portions within the head from laceration. More particularly, it is concerned with an automatic livestock head splitter having a supporting frame, a circular rotatable blade carried by the frame that includes a peripheral cutting edge with a plurality of circumferentially spaced apart notches, a plurality of head-supporting means or platens moveably supported by the frame and connected together in serial order, a prime mover, and a power drive for connecting the prime mover, rotatable blade, and platens for movement of the platens and rotation of the blade in synchronism such that the cutting edge of the blade will split a head carried by a platen while at the same time preventing laceration of selected internal portions within the head by receipt of such portions within an adjacent notch of the blade.

2. Description of the Prior Art

Several of the internal organs of livestock heads are valuable commodities. In particular, the brain is edible, and the pituitary gland of the hog, for instance, is used in the production of insulin. Extraction of internal organs from the skull of an animal must be accomplished by splitting the head in such a manner that the internal organs are not lacerated or otherwise damaged.

Conventional apparatus for the splitting of livestock heads employ a reciprocating blade that includes a notch in the cutting edge for receipt of the head's internal organs therein. U.S. Pat. No. 3,890,673 to Neubauer, for instance, discloses a generally rectangular blade that is reciprocated in an up and down fashion while butchered and trimmed livestock heads are shifted to a cutting position beneath the blade. Previous head splitters, however, require considerable operator involvement and relatively high power requirements, and are characterized by their relatively slow rate of operation. For example, conventional hog head splitters employing a reciprocating blade may require as many as three operators and power requirements in the range of 10-20 horsepower to process only about 1,200 heads per hour. An automatic livestock head splitter that is operable with a minimum of operator involvement, requires a minimum of power requirements and is capable of splitting heads at an increased rate would therefore be a decided advantage.

SUMMARY OF THE INVENTION

The problems outlined above are in large measure solved by the automatic livestock head splitter in accordance with the present invention. That is to say, the automatic livestock head splitter hereof requires a minimum of operator involvement, operates with reduced power requirements, and is capable of nearly doubling the rate at which livestock heads can be split. Further, and very importantly, the device hereof is capable of safely splitting livestock heads without damaging the delicate and commercially important internal organs.

The automatic livestock splitter in accordance with the present invention broadly includes a supporting frame, a circular cutting blade rotatably carried by the frame including a peripheral cutting edge with a plurality of circumferentially spaced apart notches thereon, a plurality of head-supporting platens mounted together in serial order and moveably supported by the frame, an electric prime mover, and a power drive coupling the prime mover, platens, and circular blade for rotation of the blade in synchronism with the platens. The platens are respectively drawn into a head splitting position relative to the blade such that the cutting edge of the blade will split the head while at the same time prevent laceration of selected internal organs of the head by receipt of the organs within one of the notches in the blade's edge.

In particularly preferred forms, the prime mover is an electric, variable speed motor, and the platens are drivingly engaged by a sprocketed drive wheel. The sprockets of the drive wheel also serve to disengage the split heads from the head-carrying platens.

BRIEF DESCRIPTION OF THE DRAWINGS

FIG. 1 is a fragmentary side view of a livestock head splitter in accordance with the present invention;

FIG. 2 is an end view of the livestock head splitter;

FIG. 3 is an enlarged fragmentary sectional view taken along line 3—3 of FIG. 1;

FIG. 4 is an enlarged fragmentary end view of a livestock head splitter depicting a platen aligned with lubrication and spray-wash nozzles;

FIG. 5 is a fragmentary top view of a plurality of head-supporting platens connected together in serial order;

FIG. 6 is an enlarged fragmentary sectional view of the livestock head splitter; and FIG. 7 is a fragmentary, sectional view of a platen engaged by a sprocket wheel and having a hog's head thereon.

DESCRIPTION OF THE PREFERRED EMBODIMENT

Referring to the drawings, an automatic livestock head splitter 10 broadly includes a supporting frame 12, a circular blade 14 rotatably carried by the frame, a plurality of head-supporting platens 16, an electric motor power means 18, and a power drive assembly 20 operably connecting the motor 18 to the blade 14 and platens 16. The head splitter 10 is depicted in FIG. 1 in configuration with table 21 for receiving split heads.

In more detail, the frame 12 includes a plurality of vertically oriented legs 22 having adjustable, floor-engaging extensions 24 at the lower end thereof, and a pair of spaced apart, parallel horizontal, mid-section, support beams 26 supported by the legs 22. A plurality of vertically oriented support members 28 arranged in opposed pairs, extend upwardly from the horizontal support beams 26. A plurality of upper, laterally extending, horizontal brace members 30 interconnect respective pairs of vertical support members 28. A pair of laterally spaced apart, uppermost, horizontal beams 32 are supported by the horizontal brace members 30. A plurality of lower, laterally extending, vertically spaced apart support members 34 interconnect opposed pairs of legs 22 in rigid relationship. Frame 12 also includes an uppermost, blade-supporting framework 36.

A bearing support 38 is fixedly attached at the opposed ends of both mid-section horizontal support beams 26. A hexagonal, sprocketed drive wheel 40, rotatably supported on a centermost, transversely extending axle 42, is supported at the right hand end of frame 12 as viewed in FIG. 1 on the pair of bearing supports 38. The drive wheel 40 include six elongated, generally triangular sprocketed members spaced about the periphery of the wheel. A second hexagonal, sprocketed wheel 46 is similarly supported at the end of frame 12 about an axle 42, and include sprockets 44 similar to those of drive wheel 40.

A pair of spaced apart, parallel, generally cylindrical platen rails 48 are fixedly attached to the upper margin of horizontal beams 32. The rails 48 include a turned down portion 50 at each end thereof. A single, lowermost, centered, platen guide rail 52, generally rectangular in cross-section, is supported by centered, vertical supports 53 extending upwardly from lowermost lateral support members 34. A lubricious synthetic resin strip 54 is fixedly attached to the uppermost margin of guide rail 52.

As best depicted in FIG. 4, a plurality of lubrication nozzles 56 for dispensing edible lubricating oil 57, and cleansing spray nozzles 58, are attached to the frame 12 and oriented upwardly.

A motor support plate 60 is mounted on and between the pair of mid-section support beams 26. The electric motor 18 is carried by the support plate 60 and is advantageously a variable speed motor. The power drive 20 includes a sprocketed gear 62 mounted on axle 42 in driving engagement with the drive wheel 40. A second sprocketed gear 64 is coaxially mounted in driving engagement with the blade 14, a blade transmission assembly 66, and a central power take-off assembly 68. The power take-off assembly 68 includes three coaxially mounted sprockets 70, 72, (third sprocket not shown) drivingly coupled to a common axle 74. A plurality of connecting link chains 77, 79, 81, 83 interconnect the various gears at assemblies of the power drive 20.

The platens 16 each include a horizontal plate 85 and a vertical plate 78 mounted perpendicularly to plate 85. A sprocket-receiving, generally rectangular aperture 80 is located at approximately the center of the horizontal plate 85. The upper surface of the horizontal plate 85 includes opposed upstanding diagonal ribs 82, and head-engaging spikes 84 between the ribs 82. The upper surface of the horizontal plate also includes a relatively wide guide rail-receiving groove 86 and a narrower blade-receiving groove 88 centered within the guide rail-receiving groove 86. The vertical plate 78 includes a centered, blade-clearing slot 100, and horizontal, spaced apart, head-engaging spikes 102. The lowermost surface of the horizontal plate 85 includes parallel, spaced apart, generally arcuate, longitudinally extending guide rail receiving grooves 104. The horizontal plate 85 includes laterally extending coupling projections 106 at each corner thereof. Stress-proof links 108 are connected between adjacent projections 106 to connect the platens 16 in serial order, and form a continuous chain thereof.

The upper blade supporting framework 36 includes spaced apart, permanently mounted, rigid sidewalls 110. The circular blade 14 is drivingly attached to a central, transversely extending axle 112. The axle 112 is supported by bearing mounts 114 secured to the sidewalls 110. The axle 112 extends through one sidewall 110 and has a sprocket 64 secured thereto by means of a key 116. As best depicted in FIG. 6, the blade 14 includes a peripheral cutting edge 117 and nine equidistant, circumferentially spaced apart, generally semi-circular notches 118 in the cutting edge 117, to thereby present nine separate relieved zones, and correspondingly nine cutting portions 119.

A safety gate 120 is mounted on the blade supporting framework 36. The gate includes a pair of spaced apart, generally triangular support arms 122, and a generally U-shaped plate 124 pivotally mounted to the support arms 122 by rod 125. Reinforcing angle irons 126 are fixed to the plate 124 and a tab 128 projects from the plate 124. An electrical cut-out switch 130 is connected to the blade framework 36 in alignment with tab 128.

The blade-supporting framework 36 includes a pivotal top plate 132 hingably connected to one sidewall 110 by continuous hinge 134, and a pivotal end plate 136 hingably connected to one sidewall 110 by continuous hinge 138. A chain guard 140 is detachably mounted over gear 64 and link chain 83. The frame 12 has detachable side plates 142, 144 and 146. Suitably positioned wing nuts 148 serve to secure the various pivotal and removable plates and guards to the frame 12.

An oil collecting drip pan 150 is advantageously located beneath the drive motor 18. A water collecting pan 152 may be located beneath spray nozzles 58. The water collecting drip pan 152 advantageously includes a drain spout 154.

Referring to FIGS. 1 and 7, a butchered and trimmed hog's head 156 is depicted positioned on a platen 16. The throat area 158 of the head abuts the vertical plate 78 of the platen 16, and the forehead area 160 of the head rests against the horizontal plate 176 of the platen 16.

In operation, the electric motor 18 and power drive 20 rotate the platens in a clockwise rotation, as viewed in FIG. 1, and at the same time rotate the blade 14 in a counter-clockwise direction. A butchered and trimmed hog's head is placed on each platen 16 as it rotates off the hexagonal wheel 46. The platens are drawn seriatim into a cutting position in relation to the blade 16 for cutting of the heads 156 by the blade. It will be observed in this respect that the blade is received within the central slot 100 of plate 78 and also within the groove 88 of plate 85; in this fashion the plate 16 does not interfere with blade rotation. The blade 14 and drive wheel 40 are driven by the power train 20 in synchronism such that portions 119 of the blade peripheral cutting edge 117 split respective heads 156; as cutting thus proceeds, selected internal portions of the heads 156 are received within the adjacent blade notch 118, thereby preventing laceration or other damage to such selected internal portions.

As the platens carrying split heads pass beyond blade 14, a sprocket member 44 of wheel 40 passes into and is received within the respective platen apertures 80. This serves not only to support and guide the platens, but also effects positive dislodgement of the heads 156 from the platens 16 (see FIG. 7). The heads thereby fall under the influence of gravity to receiving table 21.

The platens 16 are easily received through the U-shaped plate 124 of safety gate 120. If an arm, or other body part of an operator, however, is interposed between a moving platen 16 and the U-shaped plate 124 of safety gate 120, the gate plate 124 will pivot counter-clockwise as seen in FIG. 1, thereby disengaging tab 128 from switch 130. Disengagement of the tab 128 from the cut-out switch 130 serves to disconnect power to the electric motor 18, thereby stopping rotation of the blade 14 and movement of the platens 16.

After the head 156 is dislodged from the platens 16, the platens travel around drive wheel 40 and proceed to the second wheel 46 in an upside down configuration. As best depicted in FIG. 4, the platens 16, while in an upside down configuration, may be cleansed by the spray from spray nozzles 58. Additionally, edible lubricating oil 57 may be dispensed from nozzles 56 onto the lower surface and rail receiving grooves 104 of the platens 16.

I claim:

1. An apparatus for splitting the heads of livestock comprising:
    frame means;
    a circular blade rotatably carried by said frame means and having a peripheral cutting edge including structure defining a plurality of circumferentially spaced apart notches intersecting said cutting edge to present a plurality of circumferentially spaced apart relieved zones at said periphery with portions of said cutting edge between respective relieved zones;
    a plurality of means moveably supported by said frame means for carrying said livestock heads;
    power means operably connected to said head supporting means for drawing said head supporting means seriatim into a cutting position for cutting of said carried heads by said blade; and
    means operably connecting said power means, head-supporting means and blade, for movement of said head-supporting means respectively into said cutting position, and for rotation of said blade in synchronism with said movement of said head supporting means in order that said portions of said blade edge split corresponding carried heads and a relieved zone on said blade prevents excess cutting of said carried head and damage to selected internal portions of said head.

2. An apparatus as in claim 1, said head carrying means comprising platens including
    an upstanding plate including structure defining a blade receiving slot therein; and
    a generally horizontal plate fixedly attached to said vertical plate and including structure defining a sprocket-receiving aperture therethrough.

3. An apparatus as in claim 2, said horizontal plate including structure defining a generally centered groove for receiving said blade therein.

4. An apparatus as in claim 3, said frame means including a platen guide rail, and said horizontal plate including structure defining a second, generally centered groove, being shallower and wider than said blade-receiving groove, for receiving said guide rail therein.

5. An apparatus as in claim 2, said platens being connected together in serial order to form an endless, rotatable chain.

6. An apparatus as in claim 5, said power connecting means including a platen-engaging drive wheel having a peripheral edge and a plurality of spaced apart, outwardly extending sprockets along said edge, said sprockets being sequentially and drivingly received within said apertures for advancing said platens seriatim into said cutting position and for dislodging said heads carried by said platens.

7. An apparatus as in claim 1, said power means comprising a variable speed electric motor.

8. An apparatus as in claim 1, including means operably connected to said power means for detecting the presence of oversized objects proximal said blade and for disconnecting said blade from said power means when said objects are detected by said detecting means.

9. An apparatus as in claim 1, including means for cleaning said platens operably connected to said frame means.

10. An apparatus for splitting the heads of livestock comprising:
    frame means;
    blade means for severing said heads;
    a plurality of interconnected means movably supported by said frame means for carrying said heads and each including a plate with structure defining an aperture therethrough;
    power means operably connected to said head-supporting means for drawing said head-supporting means seriatim into a cutting position relative to said blade means, including a rotatable member having a plurality of outwardly extending projections thereon,
    said projections being configured and arranged for respective insertion into corresponding plate apertures during operation of said power means; and
    means mounting said member for rotation thereof, and for insertion of said projections into corresponding ones of said plate apertures, during operation of said power means, in order to advance said head-supporting means and to dislodge split heads from said head-supporting means.

11. An apparatus as in claim 10, said blade being generally circular and said frame means including means for rotatably supporting said blade thereon.

12. An apparatus as in claim 11, said blade having a peripheral cutting edge including structure defining a plurality of circumferentially spaced apart notches intersecting said cutting edge to present a plurality of circumferentially spaced apart relieved zones at said periphery with portions of said cutting edge between respective relieved zones.

13. An apparatus for supporting butchered and trimmed livestock heads, and for carrying said head into cutting engagement with a head splitting implement, comprising:
    an upright plate including structure defining a slot for receiving said implement therethrough; and
    a generally horizontal plate adjacent said vertical plate and including structure defining a sprocket-receiving aperture therethrough.

14. An apparatus as in claim 13, said horizontal plate including structure defining a generally centered groove for receiving said implement therein.

15. An apparatus as in claim 13, including means for interconnecting said upright and horizontal plates.

* * * * *